United States Patent [19]

Niederer

[11] 4,117,922

[45] Oct. 3, 1978

[54] COILED SPRING CONVEYOR FOR EGGS

[75] Inventor: Thomas O. Niederer, Titusville, N.J.

[73] Assignee: Otto Niederer Sons, Inc., Pennington, N.J.

[21] Appl. No.: 775,028

[22] Filed: Mar. 7, 1977

[51] Int. Cl.² ................ B65G 39/06; B65G 39/20
[52] U.S. Cl. ............................ 198/652; 198/779; 356/58
[58] Field of Search ............... 198/373, 384, 387, 412, 198/445, 446, 458, 495, 652, 655, 779; 134/71, 72, 124; 356/57, 58

[56] References Cited

U.S. PATENT DOCUMENTS

| | | | |
|---|---|---|---|
| 3,080,955 | 3/1963 | Fennell | 198/387 |
| 3,148,761 | 9/1964 | Niederer | 198/412 |
| 3,155,102 | 11/1964 | Niederer, Jr. et al. | 198/779 |
| 3,216,549 | 11/1965 | Niederer et al. | 198/655 |
| 3,241,433 | 3/1966 | Niederer, Jr. et al. | 356/57 |
| 3,428,162 | 2/1969 | Niederer | 198/652 |
| 3,610,400 | 10/1971 | Burkholder | 198/384 |
| 3,623,591 | 11/1971 | Koch et al. | 198/445 |
| 3,848,730 | 11/1974 | Niederer et al. | 198/779 |

Primary Examiner—Evon C. Blunk
Assistant Examiner—Richard K. Thomson
Attorney, Agent, or Firm—Albert Sperry; Frederick A. Zoda; John J. Kane

[57] ABSTRACT

An improved coiled spring conveyor particularly usable in an egg handling system for movement through stations which include both operations of candling and washing which comprises a plurality of coiled springs positioned about parallel rods which extend transversely to the direction of movement of the conveyor and eggs, the coiled springs being generally cylindrical including a first spring section of narrow diameter for firmly gripping the parallel rods and including a second spring section being slightly concave with respect to the transverse cross-section thereof to cooperate with adjacent similarly configured second spring sections to define a plurality of egg receiving recesses therebetween, the first spring sections and second spring sections being alternately positioned along each coiled spring to define a plurality of rows of egg receiving recesses extending parallel to the direction of egg movement on the conveyor, the respective second spring sections including a generally centrally located opaque section which may be formed by abutment between adjacent turns within said coiled springs to thereby block the passage of light therethrough during candling, the spring conveyor further alternatively including a driving apparatus adjacent the ends of the parallel rods to provide a manner for driving the conveyor and also alternatively including a plurality of walls positioned above the spring conveyor and more particularly directly above the smaller internal diameter first spring sections to prevent the movement of eggs into the first spring section to thereby urge the movement of eggs into the plurality of rows of egg receiving recesses.

7 Claims, 4 Drawing Figures

COILED SPRING CONVEYOR FOR EGGS

BACKGROUND OF THE INVENTION

1. Field of the Invention

The present invention deals generally with the field of egg handling equipment and is particularly adaptable for usage with conveyor systems used for candling and washing of eggs.

Many devices have been designed for the conveying of eggs through egg handling systems to facilitate grading, candling, orienting, arranging, washing, weighing, etc. Spring carrying members have been utilized to provide a conveyor surface construction which may be varied in length at various stations throughout the line of conveying to vary the effective width of the conveyor. The conveyor spring assembly disclosed and claimed in this application provides a system which is particularly useful in operations where candling and washing are positioned as adjacent stations, however the conveyor of the present design can be utilized with any standard egg handling system.

2. Description of the Prior Art

Systems used in the prior art have been shown using spring conveyor surfaces for carrying eggs such as U.S. Pat. Nos. 3,241,433 and 3,232,413 which disclose egg candling systems. Also U.S. Pat. No. 3,148,761 discloses a general egg supporting and handling system which utilizes spring support means for maintaining the eggs within a plurality of predefined rows of egg receiving recesses. Another such design is shown in U.S. Pat. No. 3,155,102.

An improved design was disclosed in U.S. Pat. No. 3,216,549 which includes a plurality of intermediate portions within a convexly coiled spring egg supporting means which intermediate portions serve by the additional usage of a collar or sleeve to block out stray light radiating upwardly through the candling slots. Such stray light tends to hinder the candling operation by contacting the eyes of the candling operator directly or after reflection from the various metal and other components of the surrounding environment. This egg supporting means configuration is shown as prior art in FIG. 3 of the present invention.

Often it is desired to place a candling station adjacent or near the washing station within the egg handling and conveying line. With such configurations the eggs may be transferred between a candling conveyor shown as prior art in FIG. 3 and a washing conveyor shown as prior art in FIG. 4. This transfer is wasteful of the equipment and space within the egg handling line which is utilized by the transfer equipment. The elimination of a transfer step between an egg washing conveyor and an egg candling conveyor most importantly minimizes breakage. Also in most egg processing systems the conveyor used in candling is not continuously washed as is the conveyor used for washing, obviously. By using a single spring conveyor, such washing is effected. As such, it is desirable to provide a single spring conveyor which is adapted for usage with the operation of candling as well as the operation of washing.

The coiled spring conveyor supporting means shown in FIG. 3 is useful for candling since the collars will block out stray light and facilitate direct viewing of the light passing through the eggs themselves. However, this spring supporting means is not preferable within a washing station since the accumulation of dirt, feathers and other contaminants within and around the wide flat collar or sleeve assemblies will tend to reduce the overall effectiveness of the washing operation within a very short period of time of usage. Also the washing solutions will not easily drain from the flat annular metal sleeves and rinsing for complete cleansing of the eggs and conveyor will be made quite difficult without an expensive periodic cleaning or maintenance. The coiled spring conveyor shown in FIG. 4 is particularly adaptable for use within a washer since the entire supporting means is configured from a single coiled wire and therefore drainage is facilitated. However, the washing spring of FIG. 4 is not usable with a candling operation since the spaced relation of the coils positioned in linear orientation with respect to the line of egg receiving recesses will allow the passage upward therethrough through the light emitting slots positioned below the conveyor and as such stray light and reflected light will inhibit the performance of personnel conducting the candling operation. As such, it is desirable to provide a single conveyor spring which is usable for both blocking out of stray light during candling and which at the same time facilitates drainage from the area of a washing operation. With this end purpose in mind the coiled spring conveyor assembly of the present invention was designed.

SUMMARY OF THE INVENTION

The present invention provides an improved coiled spring conveyor for eggs which comprises a plurality of coiled springs positioned concentrically about a plurality of parallel rods which themselves extend perpendicular to the direction of movement of the egg conveyor. The coiled springs define a plurality of egg receiving recesses between adjacent pairs thereof to facilitate the holding of eggs moving upon the egg conveyor. The coiled springs include a small diameter first spring section which may assume a cylindrical configuration having an internal diameter sufficiently small to tightly grip the parallel rods when positioned concentrically therearound. Interspaced alternately between each adjacent first spring section on each coiled spring is a second spring section which has a substantially larger coil diameter than the smaller cylindrical spring section. These second spring sections are generally cylindrical however the outward face thereof should be slightly concave to facilitate in defining the egg receiving recesses between adjacent second spring sections of adjacent coiled springs. By providing alternate first and second spring sections in each coiled spring positioned about each parallel rod a plurality of rows of egg receiving recesses will be provided extending parallel with respect to the movement of eggs on a conveyor.

These parallel rows of egg receiving recesses may be separated by the positioning of a separator or divider above the surface of the spring conveyor directly vertically above the smaller diameter first spring sections to thereby prevent the movement of smaller eggs into the opening provided between the egg receiving recesses by the narrow diameter first spring sections. These dividers will serve to urge the individual eggs into the individual egg receiving recesses and thereby provide an orderly arrangement of the eggs into orientation within the receiving recesses.

The second spring sections shall include an opaque center section which is created by forming the coiled spring with the turns thereof in abutment for a short distance in the approximate center of the second spring sections. This opaque section will thereby prevent the passage of light therethrough during candling and as such will eliminate stray light beams from passing upwardly through the conveyor and between the eggs into the eyes of the candler. In this manner egg candling will be facilitated. At the same time however the spring for the conveyor means will be formed from a single turned wire and as such will not inhibit drainage therethrough when the eggs are passed through a washing station. The light will pass upwardly through the conveyor through a plurality of light slots therebelow which are oriented directly below the opaque center sections and the egg receiving recesses such that as long as an egg is located within each egg receiving recess there will be no stray light directed upwardly except for the direct light which passes through the individual eggs located within the recesses. The conveyor system may include a driving apparatus of any standard configuration such as a chain drive secured to the ends of the individual rods.

The present apparatus may be configured with a single wire turned to form the coiled springs which are in spaced relationship with respect to adjacent turns except within the opaque section of the second spring section wherein the spring is formed utilizing abutting coiled turns. Except for the opaque section and the cylindrical section the coiled spring is formed by spaced turns which are oriented in spaced relationship with respect to adjacent turns of the coiled springs. In this manner, a coiled spring conveyor design is achieved which is usable for both candling and washing and, as such, eliminates the need for an additional transferring step in the egg processing line.

It is an object of the present invention to provide an improved coiled spring conveyor for eggs which can be used for a full and efficient washing operation as well as a fully effective candling operation.

It is an object of the present invention to provide an improved coiled spring conveyor for eggs which blocks the upwardly directed stray light passing between adjacent egg receiving recesses.

It is an object of the present invention to provide a spring conveyor for eggs which is formed from a single turned wire to allow for full drainage and full carrying away of contaminants during a washing operation.

It is an object of the present invention to provide an improved spring conveyor for eggs which is laterally expandable and compressible to vary the distances between egg receiving recesses and to possibly vary the chosen orientation for the eggs when located within the recesses.

It is an object of the present invention to provide an improved spring conveyor for eggs which include the plurality of turns adjacent the egg receiving recesses which are in abutment with one another to thereby prevent stray light from passing upwardly therethrough.

It is an object of the present invention to provide an improved coiled spring conveyor for eggs which utilizes a plurality of dividers for urging the eggs into the egg receiving recesses between adjacent transversely extending coiled springs.

It is an object of the present invention to provide a coiled spring conveyor for eggs which defines a plurality of slightly yieldable egg receiving recesses to minimize egg breakage while at the same time allowing candling and washing while the eggs are positioned upon a single conveyor.

It is an object of the present invention to provide an improved spring conveyor for eggs which minimizes cost of an egg handling or processing line.

It is an object of the present invention to provide an improved coiled spring conveyor which minimizes the time required for processing of eggs.

It is an object of the present invention to provide an improved spring conveyor which minimizes the possibility of small eggs falling in between the predefined egg receiving recesses.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
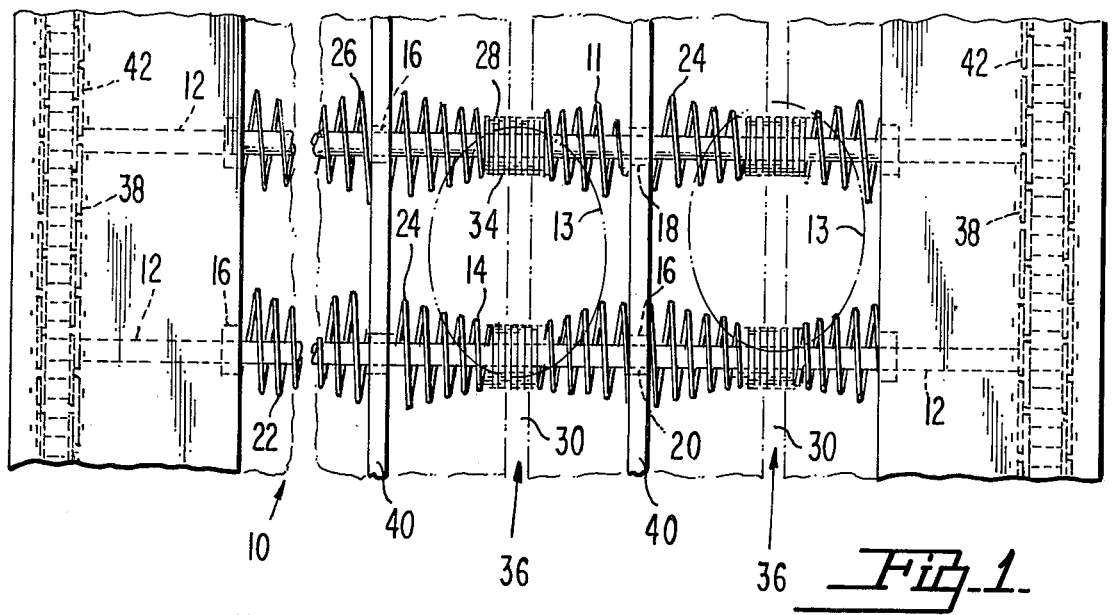
FIG. 1 is a top plan view of an embodiment of the improved coiled spring conveyor of the present invention.

The improved coiled spring conveyor 10 utilized for carrying eggs 13 comprises a plurality of coiled springs 11 positioned about a plurality of parallel rods 12 extending transverse with respect to the direction of movement of the spring conveyor. The coiled springs 11 cooperate with adjacent similarly configured coiled springs when positioned about adjacent parallel rods to define a plurality of egg receiving recesses 14 therebetween.

The coiled springs 11 may be configured to include a first spring section 16 which has a relatively small internal diameter 20 which is slightly, more than the external diameter of the parallel rods 12 and, as such, will grip the external surface thereof and hold the springs 11 in place with respect thereto. In this manner the coiled springs 11 will be firmly oriented in place by the relatively firm slidable engagement between the first spring section 16 and the exterior of the parallel rods 12. The coiled springs 11 will include a cylindrical section 18 which will normally comprise the first spring section 16. This cylindrical area will more closely grip the parallel rods 12 by being formed by abutting turns 34 of the spring.

Alternately positioned between adjacent first spring sections 16 within a given coiled spring 11 will be second spring sections 22. These second spring sections will be generally configured including a large internal diameter 24 in comparison with the internal diameter of the first spring section 16 which will be small such as shown as diameter 20. The second spring section 22 will also be configured in an approximate cylindrical shape however the outer surfaces 26 thereof may assume a slightly concave external profile in order to form an egg receiving recess 14 with an adjacent coiled spring 11 which is more adaptable to receive an egg therein.

As shown in FIG. 1 the concave outer surface 26 of the second spring sections 22 of adjacent coiled springs 11 will cooperate to define a single egg receiving recess therebetween. Since the first spring section 16 and the second spring sections 22 are positioned alternately transverse with respect to the conveyor, the egg receiving recesses 14 will be arranged in longitudinally extending rows parallel with respect to the direction of movement of the eggs on the conveyor to aid in the orientation and arrangement of the eggs for further handling and processing steps within the egg processing line.

The coiled spring conveyor 10 of the present invention is particularly useful for candling operations in which a plurality of light slots 30 will be positioned therebelow which will include lights thereunder such that light will pass upwardly through the slots 30 and onto the bottom surface of the eggs which are positioned within the egg receiving recesses 14. In this manner an operator may look downwardly from above upon the eggs 13 moving on the coiled spring conveyor 10 to determine whether any shell cracks or blood spots exist within the eggs passing thereby. To facilitate this candling operation it is desirable that the only light which will be passing upward therethrough will be required to pass through the eggs. In order to achieve this desired end, the shape in between adjacent eggs which is directly above the light slot should be opaque with respect to the upward passage of light. In so doing the stray light and reflected light will be prevented from disturbing the personnel charged with the candling operation and, as such, will enhance the reliability of the particular candling operation. In order to eliminate this upward passage of light an opaque section must be configured within the large diameter second spring section 22. This opaque section 28 is formed by the coiled spring 11 of the present invention by utilizing abutting turns 34 of adjacent turns of the coiled spring within the center area of the second spring section 22. The usage of abutting turns 34 rather than any sort of wide band or other configuration of opaque material for blocking this light allows the same conveyor to be utilized in the washing station as well as the candling station. By utilizing a single conveyor for both operations much time and expense is saved since no transferring operation is required between two different conveyors due to the fact that the coiled spring conveyor 10 of the present invention provides a single type of coiled spring 11 which is usable at both stations.

Except for the abutting turns 34 utilized in the opaque sections 28 and, possibly, in the first spring section 16, the coiled springs 11 will utilize spaced turns 32 which turns will be in spaced relationship with respect to one another such that a completely flexible construction is used to support the eggs to thereby minimize breakage.

The alternate first and second spring sections within each coiled spring 11 will define a plurality of rows 36 of such egg receiving recesses which orientation is desirable in other phases of egg handling within the same egg processing line. In addition, the coiled spring conveyor 10 of the present invention may utilize a plurality of divider means 40 for separating the eggs on the coiled spring conveyor 10 to urge them into orientation within the egg receiving recesses 14. The divider means 40 may be in the form of a wall or any other type of deflecting system or design which is positioned slightly above the surface of the conveyor 10 and is oriented immediately above the first spring sections 16 such that smaller eggs which might possibly be caught in the first spring section 16 will be urged into proper orientation within the egg receiving recesses 14 along the line of second spring sections 22. In this manner the orientation of the eggs into the proper recesses will be achieved.

To provide a means for moving the conveyor 10 a driving apparatus 38 such as chain means 42 may be positioned secured to the ends of rods 12 to provide a simple means for moving the surface of the conveyor 10. Many such systems are available and are known in the prior art.

Figure 2:
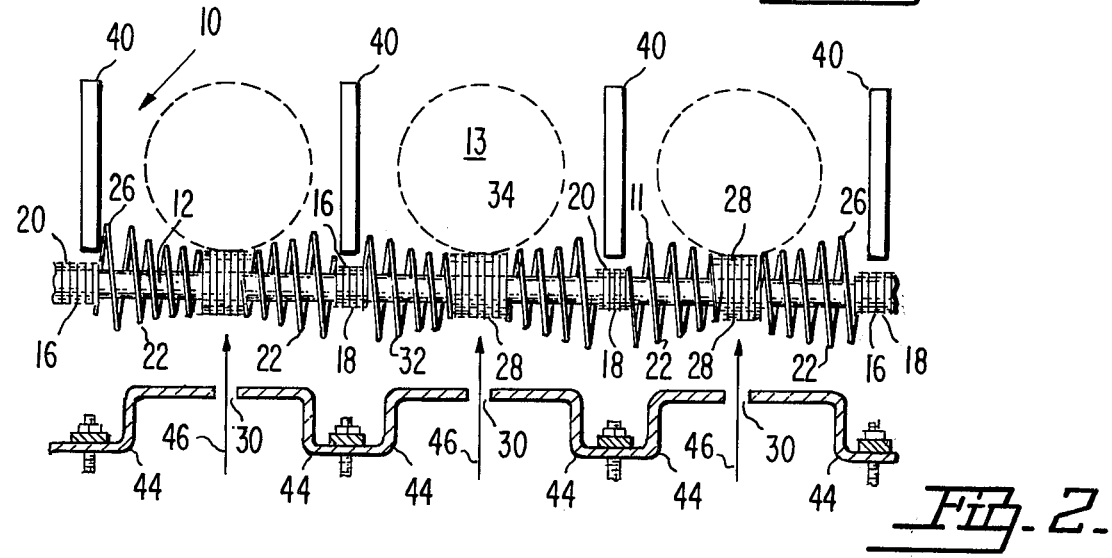
FIG. 2 is a front view of the embodiment shown in FIG. 1.
Figure 3:
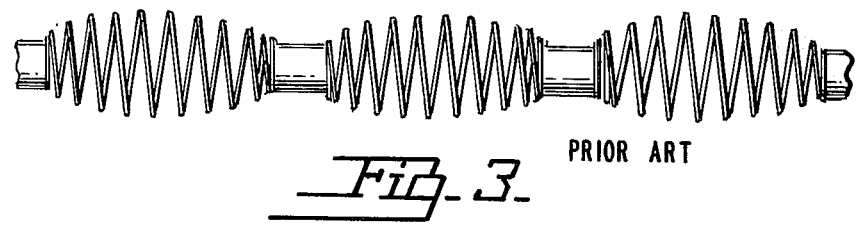
FIG. 3 is a top view of a coiled spring of the prior art.
Figure 4:
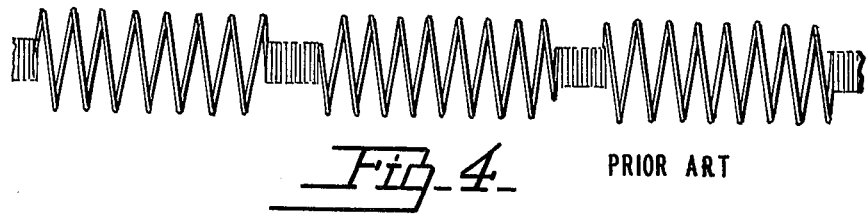
FIG. 4 is a top view of another coiled spring of the prior art.

FIG. 2 more illustratively shows the light shields 44 positioned below the improved coiled spring conveyor 10 and shows the operation of the opaque sections 28 to block the light which radiates upwardly between adjacent shields as shown by arrows 46. The opaque sections 28 will serve to eliminate the passage of stray light upwardly into the eyes of the candling personnel through the spring sections adjacent the egg receiving recesses and between adjacent eggs. In this manner as long as there is an egg positioned within each egg receiving recess 14 the upwardly directed stray light will be eliminated by the abutting turns 34 which form the opaque section 28 of the second spring section 22.

The increased reliability and cost savings achievable by the usage of abutting turns 34 to form the opaque sections 28 should be appreciated since the losses inherent with any transferring of eggs from one conveyor to another conveyor is completely eliminated by the usage of only a single conveyor. Also the per unit or per egg processing time is minimized since the length of the egg handling line may be shortened with the usage of one rather than two conveyors for candling and washing. Finally, the obvious advantage of financial savings due to the elimination of the capital outlay required for the transferring apparatus should be appreciated.

At this point it should be noted that while particular embodiments of this invention have been shown in the drawings and described above, it will be apparent, that many changes may be made in the form, arrangement and position of various elements of this invention. In full consideration thereof it should be understood that preferred embodiments of this invention disclosed herein were intended to be illustrative only and were not intended to limit the scope of the invention in any way.

I claim:

1. An improved coiled spring conveyor for eggs comprising:
   (a) a plurality of parallel rods extending transversely with respect to the direction of movement of the conveyor;
   (b) a plurality of coiled springs positioned about said rods concentrically to define a plurality of egg receiving receses between pairs of said coiled springs positioned about adjacent rods, each of said coiled springs further includling:
   (1) a plurality of first spring sections having a generally cylindrical configuration, said first spring sections having an internal coil diameter slightly larger than the outside diameter of said rods to facilitate gripping of said rods by said coiled springs when positioned therearound; and
   (2) a plurality of second spring sections having a coil diameter larger than the coil diameter of said first spring sections, said second spring sections having a generally cylindrical configuration with a slightly concave outer surface to cooperate with other second spring sections of adjacent coiled springs to define egg receiving recesses therebetween, said second spring sections including an opaque section in the approximate center thereof for preventing the passage of light therethrough during candling, said opaque section being formed by abutment between adjacent turns of said coiled spring within said second spring section, said opaque section having an internal diameter greater than the internal diameter of said first section and greater than the outside diameter of said rod.

2. The conveyor as defined in claim 1 wherein said first spring sections and said second spring sections are alternately positioned along each coiled spring to form a plurality of rows of said egg receiving recesses extending parallel with respect to the direction of movement of the conveyor.

3. The conveyor as defined in claim 2 further comprising a plurality of divider means positioned above said coiled springs, said divider means extending parallel with respect to the conveyor above said first spring sections thereof to guide the eggs into said rows of said egg receiving recesses extending parallel to the conveyor and to prevent the eggs from lodging within said first spring section.

4. The conveyor as defined in claim 1 wherein adjacent turns of coiled spring within said second spring section are in abutment with respect to one another within said opaque section and are in spaced relationship apart from one another elsewhere within said second spring section.

5. The conveyor as defined in claim 1 wherein adjacent turns of said coiled spring within said first section are in abutment with one another to facilitate a firm holding of said coiled springs with respect to said parallel rods.

6. The conveyor as defined in claim 1 further comprising a driving apparatus attached to said rods to cause movement of the coiled spring conveyor.

7. An improved coiled spring conveyor for eggs comprising:
  (a) a plurality of parallel rods extending transversely with respect to the direction of movement of the conveyor;
  (b) a plurality of coiled springs positioned about said rods concentrically to define a plurality of egg receiving recesses between adjacent pairs of said coiled springs, each of said coiled springs further including:
    (1) a plurality of first spring sections having a generally cylindrical configuration, said first spring sections having an internal coiled diameter of said rods to facilitate gripping of said rods by said coiled springs when positioned therearound; and
    (2) a plurality of second spring sections alternately located with said first spring sections along each of said coiled springs, each second spring section having a coil diameter larger than the coil diameter of said first spring sections, said second spring sections having a generally cylindrical configuration with a slightly concave outer surface to cooperate with second spring sections of adjacent coiled springs to define egg receiving recesses therebetween arranged in rows parallel with respect to the conveyor, said second spring sections including an opaque section in the approximate center thereof for preventing the passage of light therethrough during candling, said opaque sections of said second section being formed by abutment between adjacent turns, the remainder of said second section having turns thereof in spaced relationship apart with respect to one another, said opaque section having an internal diameter greater than the internal diameter of said first section and greater than the outside diameter of said rod.

* * * * *